Feb. 10, 1953          R. D. RICHARDSON                2,628,332
                       MEASURING INSTRUMENT
Filed Jan. 24, 1947                              6 Sheets-Sheet 1

INVENTOR.
ROBERT D. RICHARDSON.
BY
Altach + Knoblock
ATTORNEYS.

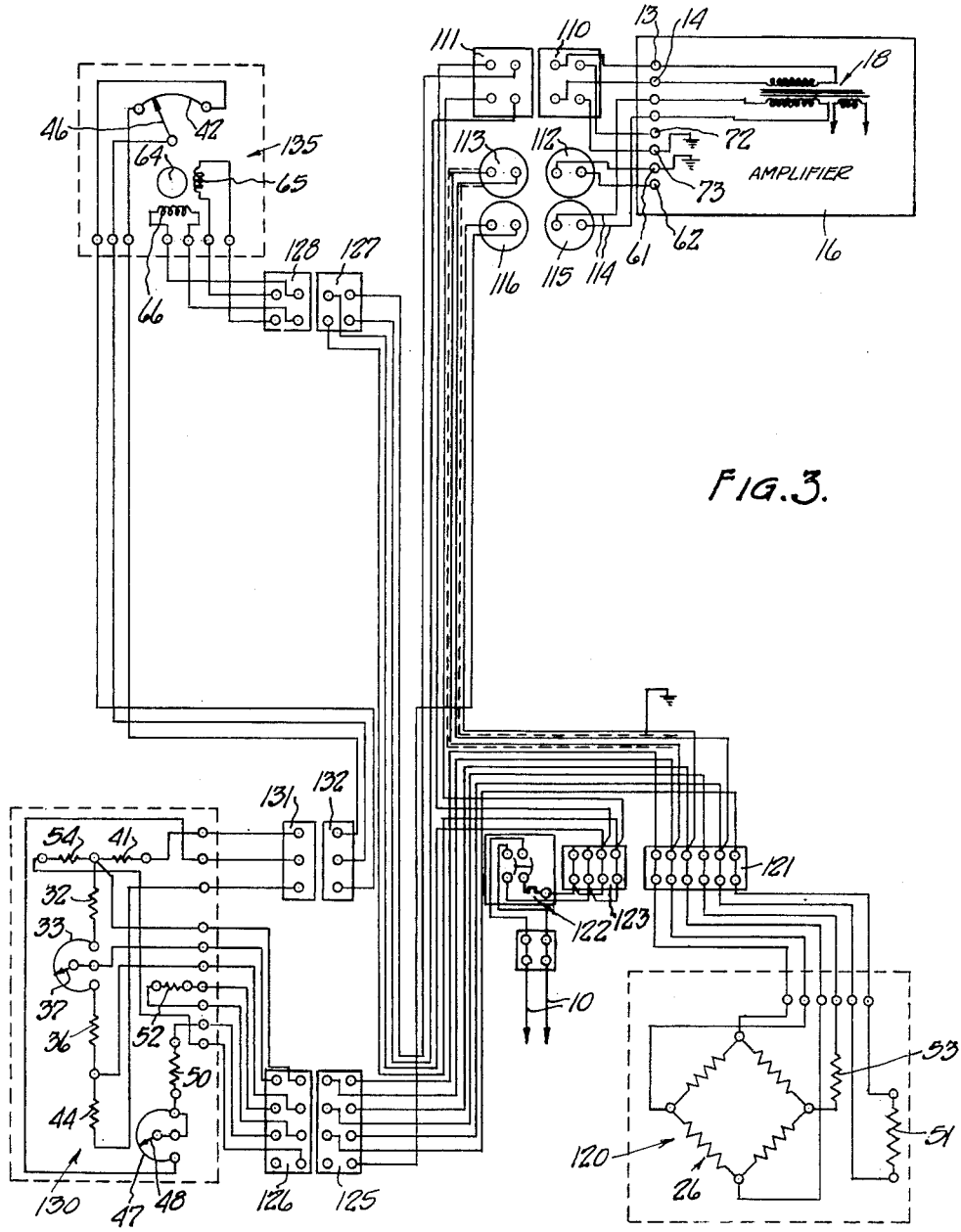

INVENTOR.
ROBERT D. RICHARDSON.
BY
Altsch + Knoblock
ATTORNEYS.

Feb. 10, 1953 R. D. RICHARDSON 2,628,332
MEASURING INSTRUMENT
Filed Jan. 24, 1947 6 Sheets-Sheet 6

INVENTOR.
ROBERT D. RICHARDSON.
BY
Altsch + Knoblock
ATTORNEYS.

Patented Feb. 10, 1953

2,628,332

UNITED STATES PATENT OFFICE 2,628,332

MEASURING INSTRUMENT

Robert D. Richardson, Michigan City, Ind., assignor to The Hays Corporation, Michigan City, Ind., a corporation of Indiana Application January 24, 1947, Serial No. 724,047

27 Claims. (Cl. 318—28)

This invention relates to improvements in measuring instruments, and more particularly to an instrument in the nature of an indicator, a recorder or a controller usable for measuring a variable condition such as pressure, draft, flow, temperature, gas composition, etc.

The primary object of the invention is to provide a device of this character of the null balance type which uses an alternating current Wheatstone bridge circuit for measurement and for control of the indicating or recording means.

A further object is to provide an instrument which is simple in construction, which has a high accuracy, which is fast in operation, which is reliable, whose hysteresis is negligible, and which has adequate power for operation of its driven parts.

A further object is to provide a device of this character which has a novel Wheatstone bridge circuit arrangement.

A further object is to provide a device of this character which is made up of a plurality of standard units whereby both the electrical and the mechanical parts of the device may be replaced quickly and easily without altering the operation of the device and with minimum requirement for recalibration and compensation incident to replacement of parts, and of such a construction that the replacement of parts can be done in the field under working conditions with minimum interference to industrial processes and equipment with which the device is associated.

A further object is to provide a device of this character having a circuit which includes a primary measuring Wheatstone bridge and a null balance follow-up means associated therewith and including parts parallel to the various legs of the measuring bridge.

A further object is to provide a device of this character which is inherently free from oscillatory reaction and hysteresis in operation so that the device need not require means to suppress oscillation and at the same time has an inherent response of a speed and accuracy which satisfies the highest standards customary in this art.

A further object is to provide a device of this character whose calibration may be changed quickly and easily for use with different types of transmitting units.

A further object is to provide a device of this character adapted to operate in response to variations of one condition with simple and easily regulated means for compensating the operations of the device for the effect of a second or external condition.

A further object is to provide a device of the null balance type having a measuring circuit including a Wheatstone bridge, an amplifier to pick up any unbalancing signal from the bridge circuit, and means including a driving motor of a very low inertia which operates at a speed proportional to the value of the signal and which is responsive to small components of predetermined frequency in signals having large components of other frequencies.

A further object is to provide a device of this character having means therein for quickly and easily calibrating the device for use with different transmitters and for different ranges of operation.

Other objects will be apparent from the following specification.

In the drawing:

Fig. 3 is a schematic wiring diagram of the device.

Figure 1:
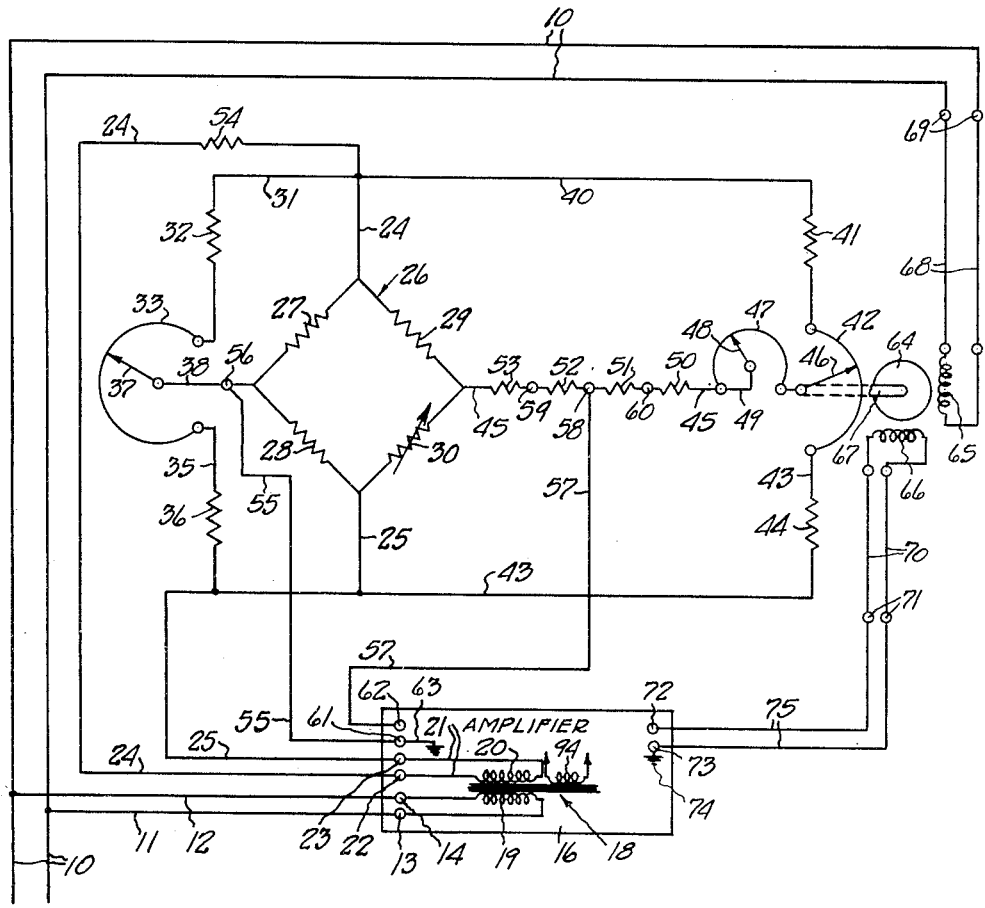
Fig. 1 is a circuit diagram of the device.

Referring to the drawings which illustrate the preferred embodiment of the invention, and particularly to Fig. 1 which constitutes a wiring diagram of the device, the numeral 10 designates leads extending from any suitable source of alternating current supply, for example, a 110 volt, 60 cycle, supply line. Leads 11 and 12 branch from this supply line 10 and are connected to the terminals 13 and 14, respectively, of an amplifier 16. The amplifier 16 has a transformer 18 associated therewith and including a winding 19 operating on line voltage and connected with the line by the leads 11 and 12. The transformer 18 has a low voltage winding 20 connected by leads 21 with terminals 22 and 23 of the amplifier. Leads 24 and 25 are connected with the terminals 22 and 23, respectively, of the amplifier and constitute the current supply for the measuring circuit.

Leads 24 and 25 constitute the input leads to a Wheatstone bridge circuit 26 having four legs, in each of which is included one of the resistances 27, 28, 29 and 30. As illustrated, the lead 24 is connected to the bridge between the legs 27 and 29, and the lead 25 is connected to the bridge between the legs 28 and 30. One or more of the resistances 27, 28, 29, 30 may constitute a variable resistance associated with a device (not shown) responsive to the condition, such as temperature, pressure, flow or draft, etc. which is to be measured.

A lead 31 branches from the lead 24 and preferably has a fixed resistor 32 interposed therein. One end of this lead 31 is connected with a slide wire 33 of a variable resistor whose opposite end is connected by a lead 35 with the lead 25. The lead 35 preferably has a fixed resistor 36 therein which balances the resistor 32. The slide wire 33 forms part of a variable resistor having a slide contact 37 which is adapted to be adjusted manually along the length of the slide wire 33 and which is connected by a lead 38 with the measuring bridge 26 between the legs 27 and 28 of that bridge.

A lead 40 branches from the lead 24 and has a fixed resistor 41 interposed therein. The lead 40 is connected with a slide wire 42 whose opposite end is connected with a lead 43 which is in turn connected to the lead 25. The lead 43 has a fixed resistor 44 interposed therein which balances the resistor 41. A lead 45 is connected with a measuring bridge 26 between the legs 29 and 30 thereof and is connected with a slide contact 46 engaging the slide wire 42.

It will be apparent from the foregoing that a bridge circuit is provided which comprises a primary or measuring bridge 26 having the legs 27, 28, 29 and 30, and a secondary or control bridge. The secondary bridge is made up of each of the legs of the primary bridge plus a leg in parallel with each leg of the primary bridge. Specifically, the leg of the secondary bridge in parallel with the leg 27 of the primary bridge is made up of the lead 31, the resistor 32 and that part of the slide wire 33 between the resistor 32 and the slide contact 37 and lead 38. The part of the secondary bridge in parallel to the leg 28 of the primary bridge comprises lead 38, the remainder of the slide wire 33 and the resistor 36 in the lead 35. The part of the secondary bridge in parallel with the leg 29 of the primary bridge comprises the lead 40, the resistor 41 and that part of the slide wire 42 between the resistor 41 and the point at which the slide contact 46 engages the slide wire, together with the lead 45 and such elements as may be interposed therein. The part of the secondary bridge which is parallel to the leg 30 of the primary bridge comprises the lead 43, the resistor 44, the part of the slide wire 42 between the resistor 44 and the point at which the contact 46 engages said slide wire and the lead 45 and such elements as may be interposed therein.

As illustrated herein, the lead 45 may have interposed therein a trim calibrating slide wire 47 engaged by a slide contactor 48 having a lead 49 connecting to the lead 45 at one side of the slide wire 47. Also there may be interposed in the lead 45 a plurality of compensating resistors here illustrated as resistors 50, 51, 52 and 53. The lead 24 may have a resistor 54 interposed therein for purposes to be described.

A lead 55 is tapped to the lead 38 at 56 intermediate connections of said lead with the measuring bridge 26 and the slide contactor 37. A lead 57 is connected to the lead 45 at a terminal 58 preferably positioned between the compensating resistors 51 and 52. It will be apparent, however, that the particular point of the lead 45 at which the lead 57 is connected may be varied as at the terminal 59 between the resistors 52 and 53 or at the terminal 60 between the leads 50 and 51. The leads 55 and 57 extend to the input terminals 61 and 62, respectively, of the amplifier 16. Of these terminals the terminal 61 is preferably grounded at 63.

A reversing motor of the two-phase type having a rotor 64 and coils 65 and 66 has a mechanical connection, as by a shaft 67, with the slide contact 46 for the purpose of adjusting the position of said contact 46. The field winding 65 is connected by leads 68 with terminals 69 to which the leads 10 are connected. The field winding 66 of the motor is connected by leads 70 with terminals 71. The terminals 72 and 73 which constitute the output terminals of the amplifier 16, and of which the terminal 73 is grounded at 74, are connected by leads 75 with the terminals 71.

Figure 4:
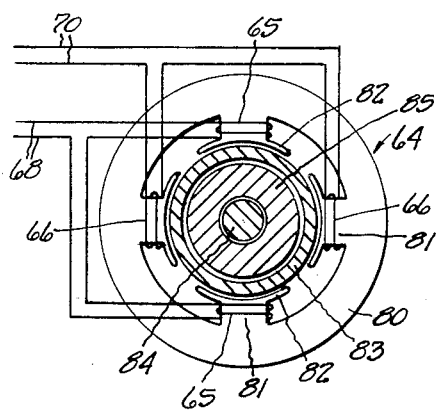
Fig. 4 is a part diagrammatic view of the motor used in the device, with parts thereof shown in section.
Figure 8:
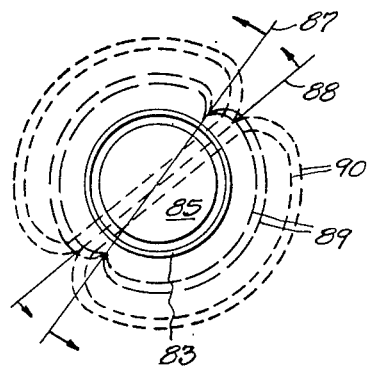
Fig. 8 is a diagrammtic view illustrating the operation of the motor.

I have found that a motor 64 which will satisfactorily fulfill the requirements for use in a device of this character is a motor of the type known as a drag cup motor. A motor of this type is illustrated in Figs. 4 to 8, inclusive. This motor is provided with a casing or housing 80 having a plurality of poles 81 terminating in pole faces 82. In the form illustrated only four pole faces are shown for convenience and simplicity of illustration, but it will be understood that in commercial practice a larger number of pole faces is customarily provided. A cup-shaped hollow rotor 83 fits concentrically within the casing 80, said cup-shaped rotor preferably being formed of copper or aluminum. The motor arbor or shaft 84 is secured to this rotor 83. A magnetic center piece 85 fits within the cup-shaped rotor 83 and has a bore 86 fitting around the shaft 84. The part 85 provides a path for magnetic flux. As best seen in Fig. 4 the member 85 fits concentrically within the cup 83 with a slight clearance.

The field windings 65 of the motor are connected in series with each other and extend around alternate poles 81 whereby the phase of the current passing through said windings is the same phase as the supply current. The field windings 66 are wound around the intervening poles and are connected in series and are responsive to the phase and amplitude of the signal from the device; that is, from the Wheatstone bridge as amplified by the amplifier 16. The phase of the field windings 66, determined by the output of the bridge and the amplifier upon an unbalancing actuation of the bridge, will normally lead or lag the phase in the field winding 65 by substantially 90 degrees. The arrangement is such that the direction of the phase displacement in the winding 66 relative to the winding 65 will depend upon the nature and sense of the variation in the condition to which the device responds. Specifically, an increase variation of the condition will produce one phase relationship, and a decrease variation will produce the opposite phase relation. Consequently, the direction of operation of the motor will depend upon the character of the output signal from the amplifier and the motor will be caused to rotate in one direction or the other for rebalancing the electrical network of the device. The phase displacement of the field windings of the motor produces an action of the character illustrated in Fig. 8 which is the equivalent of the provision of a rotating magnetic field passing through the cup.

In normal operation, the field winding 65 connected with the line is continuously energized. The field windings 66 connected with the amplifier are only intermittently energized. In the diagrammatic form illustrated in Fig. 8 the axis 87 designates the rotating flux due to the vector sum of out-of-phase currents in the field windings. The axis 88 designates the eddy current flux due to rotation of the magnetic field. The latter flux is attracted to the original field and therefore moves the rotor. Note the designations of magnetic flux as illustrated by the lines 89 and 90, with respect to which the axis lines 87 and 88 are drawn, and the fact that the same pass through the cup 83 and the member 85 which provides a flux path within the cup.

In the drag cup motor any eddy currents produced in the cup react against the original magnetic field produced by the winding 65, causing the cup to rotate with the magnetic field. The torque of this motor is proportional to the amount of current in the out-of-phase winding. In the instant device the signal from the amplifier passes through a change of 180 degrees when the bridge passes through its balance point and thus causes the motor to reverse as above mentioned. This motor has the further characteristic that it responds to very small components of some predetermined frequency, for instance 60 cycle components, in irregular signals having relatively large components of other frequencies. This is of great importance in a device of this character because high amplification of a signal does not always produce a pure sine wave of the predetermined frequency. The instant motor is capable of responding to the component of predetermined frequency in an irregular signal by reason of the absence of any definite windings in the rotor of the motor. In other words, the flux paths through the rotor may occur along any diameter or radius thereof rather than along predetermined radii as is true with motors having rotor windings. Another important characteristic of a motor of this type is its ability to operate with large amounts of direct current in the windings. This permits the motor to operate directly from a direct current source in series with the power amplifier 102 of the amplifier 16 which will be hereinafter described.

Figure 2:
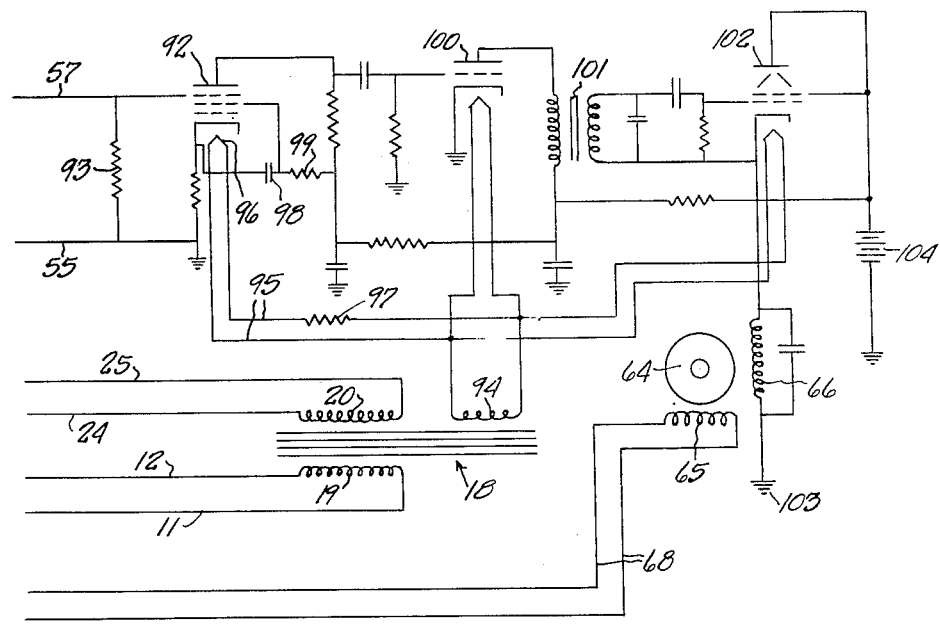
Fig. 2 is a circuit diagram of an amplifier usable in the device.

The amplifier 16 may be any amplifier for alternating current of predetermined frequency, for example 60 cycle current, which provides the required degree of amplification. Such an amplifier is illustrated in Fig. 2. The leads 55 and 57 are connected to the first stage of amplification of the amplifier designated by the amplifying tube 92, there preferably being a resistance 93 interposed across said leads in advance of the first stage of amplification. The transformer 18 has a low voltage tube heating winding 94 preferably operating at about 6.3 volts which is connected by leads 95 with the filament 96 of the first amplifying tube 92. One of these leads has interposed therein a resistance 97 which serves to reduce the voltage in the leads 95 to about 4 volts. The circuit for the first amplifying stage also preferably includes the condenser 98 and the resistance 99 which filters the screen voltage of tube 92. The signal from the first amplifier tube then passes through a second amplifier tube 100 whose filament is likewise energized from the tube heater winding 94 of the transformer 18.

A coupling transformer 101 is interposed in the circuit at the output of the second amplifier stage and its output is fed to a third amplifying stage preferably constituting a beam power amplifier tube 102 whose filament is likewise fed from the tube heater winding 94 of the transformer 18. The motor winding 66 is connected between the cathode of the beam power tube 102 and ground at 103. A direct current source 104 which may constitute a battery or a rectifier is connected in series with the beam power amplifier tube 102.

The amplifier meets several conditions which are very critical to the proper operation of this device. The reduction of the filament voltage, especially in the first amplification stage, steadies the readings of the device by holding constant the phase shift which occurs in the first stage of amplification due to filament voltage fluctuations. The signals from the transmitter delivered through the leads 55 and 57 constituting very small currents of the predetermined frequency are subject to a shift in phase in the first stage of an amplifier if such fluctuations in filament voltage at that first stage occur. Any such shifting in phase in the first stage of amplification will cause unsteady operation of the device and unsteady readings of an indicator or recorder operated thereby because such phase shift is the equivalent of a change in the balance. The resistor 97 causes the tube 92, for example, a remote cut-off pentode tube, to operate at a filament voltage which prevents fluctuations in the phase shift occurring in the amplifier from causes extraneous to variations in the transmitted signals. The coupling transformer 101 at the third stage of the amplifier is a substantial improvement in a device of this character by virtue of the fact that it tends substantially to remove and to render ineffective, upon operation of the device, such stray currents of frequencies other than the predetermined operating frequency as may exist in the signal as amplified in the first two stages from the very small initial bridge signal. In other words, any stray currents of frequencies other than the predetermined frequency, which are included in the signal fed from the transmitter to the amplifier through the leads 55 and 57, which are caused by sources extraneous to the operation of the transmitter circuit in response to variations in the condition which are the subject matter of measurement and which are amplified in the first two stages of the amplifier, are substantially wiped out by the transformer 101, thereby further improving the accuracy of the device and its response to transmitted signals. The positioning of the motor winding 66 between the cathode of the tube 102 constituting the third amplification stage and ground serves to eliminate high direct current voltages from the motor winding. One of the characteristics of the drag cup motor of the character herein used is its ability to operate with large amounts of direct current in the windings. This fact permits the operation of the motor directly from the direct current source in series with the power amplifier tube 102. The use of a beam power amplifier in connection with the drag cup control motor is believed to constitute a valuable improvement in this art by reason of the fact that a considerable increase in the amount of power available for operation of the device is made possible, and also by reason of the fact that a considerable elimination of transformers which have heretofore been necessary in amplifier-motor circuits in which the motor is controlled from the amplifier.

One of the primary requirements for a successful device of this character is that the parts must be interchangeable for quick replacement. This is accomplished in the instant device as best illustrated in Fig. 3, wherein the arrangement of the various components in unitary replaceable assemblies is illustrated diagrammatically. The amplifier 16 constitutes one of these units and has its terminals 13, 14, 72 and 73 connected with a multi-pronged plug 110 of a separable connector unit which is adapted to include a cooperating socket member 111. The amplifier input terminals 61 and 62 are connected with a two-pronged plug 112 which cooperates with a socket 113 to form another separable connector. The regulated 20 volt output from the transformer 18 is connected by leads 114 with a socket 115 cooperating with a plug 116 constituting another two-pronged separable connector. Thus it will be apparent that the amplifier unit may be completely disconnected from the remainder of the device and removed as a unit for either repair or replacement by simply disconnecting the separable connectors 110—111, 112—113 and 115—116.

The transmitter or analyzer unit 120 includes the measuring bridge 26 and the compensator resistors 53 and 51, terminal blocks 121 and a circuit breaker 122, which is preferably provided with a blow-out coil and which has leads 10 extending to the supply line. Certain of the leads from this unit 120 are connected with the socket member 113 and with the plug member 116. Other leads thereof are connected with a socket 125 of a separable connector which also includes a multi-prong plug 126. Leads from the supply terminal 123 are connected with a socket 127 of a separable connector which includes the multi-prong plug 128. It will be apparent that the transmitter unit 120 can be completely removed from the unit for ready replacement by disconnecting the various separable connectors to which its various leads extend or by disconnecting the leads to the terminal block 121.

A calibrating box 130 constitutes another unit of the device. This calibrating box preferably includes the zero adjusting means including the fixed resistors 32, 36 and the zero adjusting potentiometers 33, 37. It also includes fixed resistors 41 and 44, the trim calibrator 47, 48 and the resistors 50, 52 and 54. Certain of the leads from the calibrating box 130 are connected to the plug 126 of the separable connector 125, 126. The remaining leads from the calibrating box unit 130 are connected with a socket 131 of a separable connector having a multi-pronged plug 132. Therefore, the box 130 can be removed, as for recalibration, by disconnecting the connectors 125—126 and 131—132.

The motor unit 135 includes the potentiometer 42, 46 and the motor 64 with its windings 65 and 66. Leads from the motor windings 65, 66 extend to the plug 128; and the leads from the potentiometer 42, 46 extend to the plug 132. The motor unit can therefore be removed by disconnecting the connectors 127—128 and 131—132.

Figure 13:
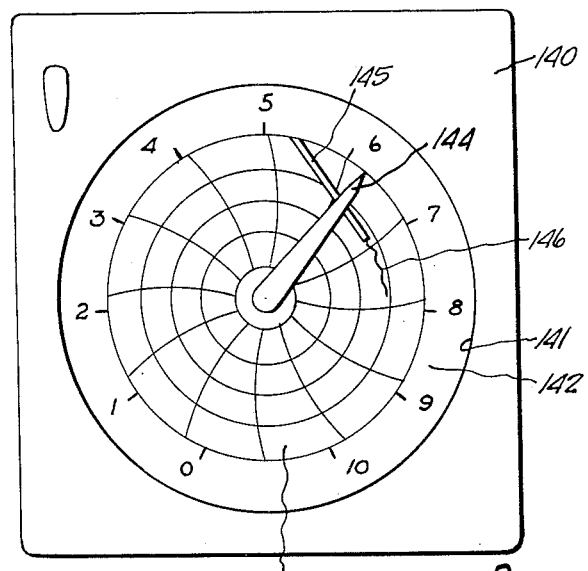
Fig. 13 is a front view of the instrument constituting one embodiment of the invention and being in the nature of a combination indicating and recording device.
Figure 5:
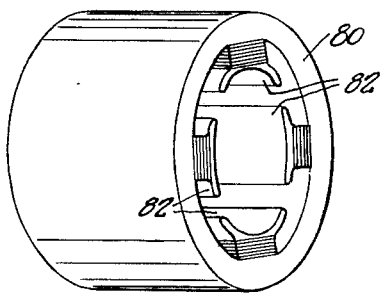
Fig. 5 is a perspective view of the casing of the motor.
Figure 6:
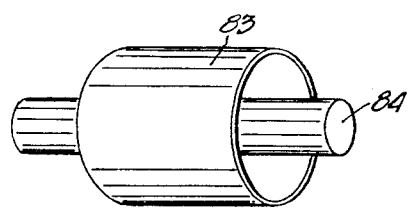
Fig. 6 is a perspective view of one of the rotor parts of the motor.
Figure 7:
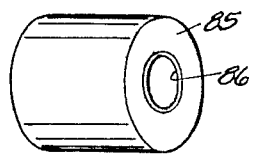
Fig. 7 is a perspective view of a core part of the motor.

In the assembly of the device in an instrument of the type shown in Fig. 13, and particularly in the casing 140 of that instrument, a very compact arrangement can be effected by virtue of the unitizing of the essential components of the device as above described, and particularly by the provision of the units 16, 120, 130 and 135, as shown in Fig. 3. This makes possible an arrangement in which the instrument serves as a combined indicator and recorder as illustrated. However, it will be understood that this instrument may likewise serve the function of a controller in addition to its indicating and recording functions by taking the necessary leads to the element to be controlled (not shown) or by effecting the necessary mechanical connections with the shaft of the motor 64, all as will be obvious to those skilled in the art. As illustrated in Fig. 13, the casing 140 has a sight opening 141 through which is exposed an indicator dial 142 and a concentric recording chart 143 of smaller diameter than the dial 142. A pointer 144 is adapted to be read in conjunction with the indicia upon the dial 142 for indicating purposes, and one or more pivoted arms 145 may be mounted in the device and provided with marking pens at their free ends for the purpose of inscribing a record line 146 upon the chart 143 for recording purposes.

Figure 9:
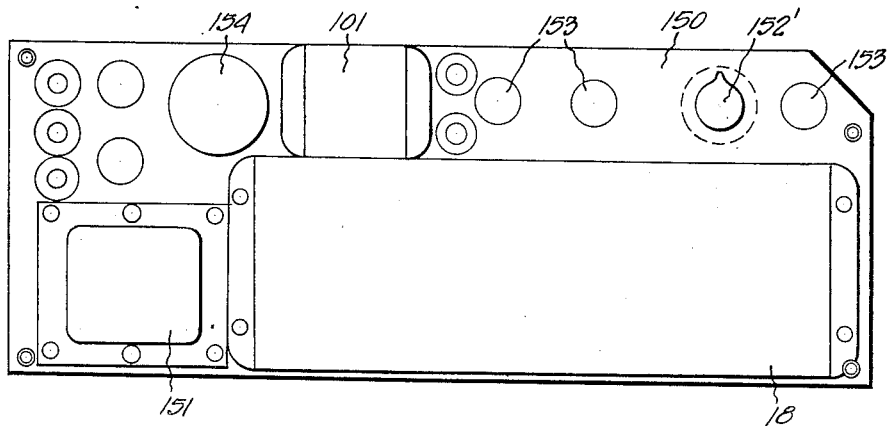
Fig. 9 is a front assembly view of a panel unit which constitutes a part of the device.
Figure 10:
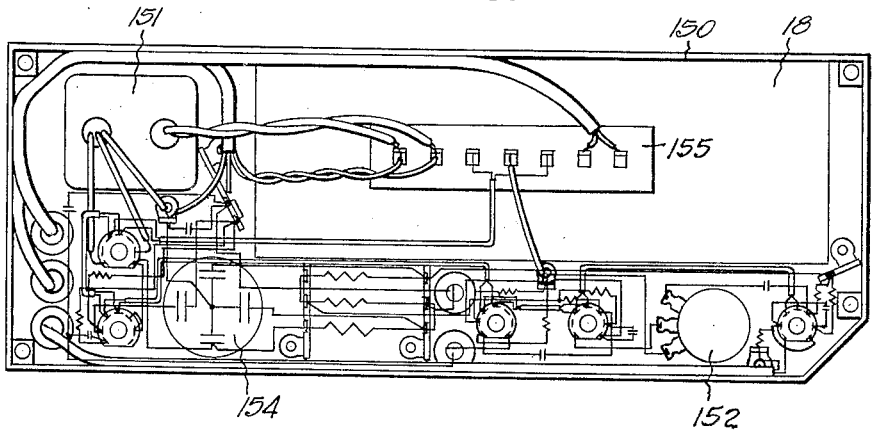
Fig. 10 is a rear view of the assembly shown in Fig. 9.

The amplifier unit 16 may be assembled within the casing 140 in the manner illustrated in Figs. 9 and 10 to occupy only a small part of the space within that casing. This unit is mounted upon a frame 150. For purposes of illustration only, and without exhaustive enumeration of the parts which make up the assembly shown in Fig. 9, attention is directed to certain salient parts as assembled upon this frame 150. The constant voltage transformer 18 occupies a substantial part of the housing 150 at one corner thereof and has associated with it in end-to-end arrangement therewith a power transformer 151. The volume control potentiometer 152 is mounted as shown in Fig. 10 at one side of the frame 150 and has a knob 152' for adjustment thereof projecting at the opposite or outer face of the frame 150. Sockets 153 are carried by the frame 150 adjacent the adjusting knob 152' for the reception of the electron amplifying tubes of the amplifier unit. The transformer terminal block 155 is mounted upon the back of the transformer 18. The various condensors which form parts of the amplifier circuit are mounted compactly in a condensor pack 154. It will be understood that the necessary leads to the various units will be provided, which leads have not been shown herein inasmuch as they have been fully illustrated in Fig. 2. However, in Fig. 10, an additional stage of amplification, as compared to that shown in Fig. 2, has been added. It will also be understood that the connector elements 110, 112 and 115 shown in Fig. 3, are not illustrated in Figs. 9 and 10.

Figure 11:
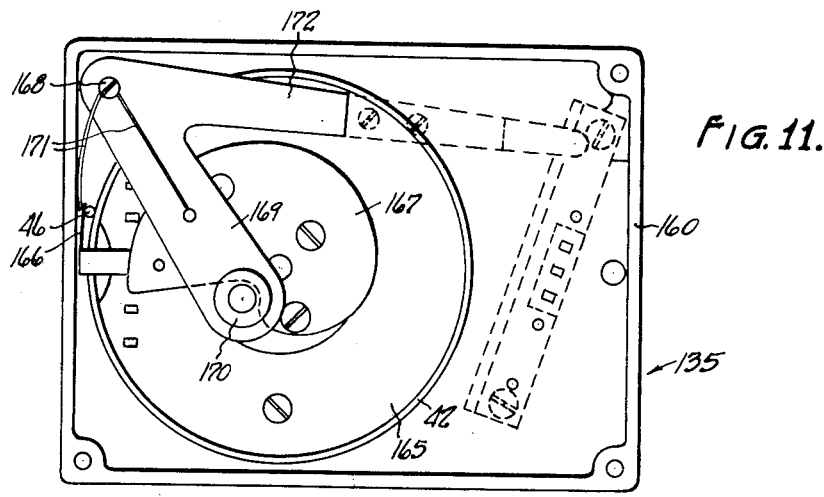
Fig. 11 is a view of another component of the device.
Figure 12:
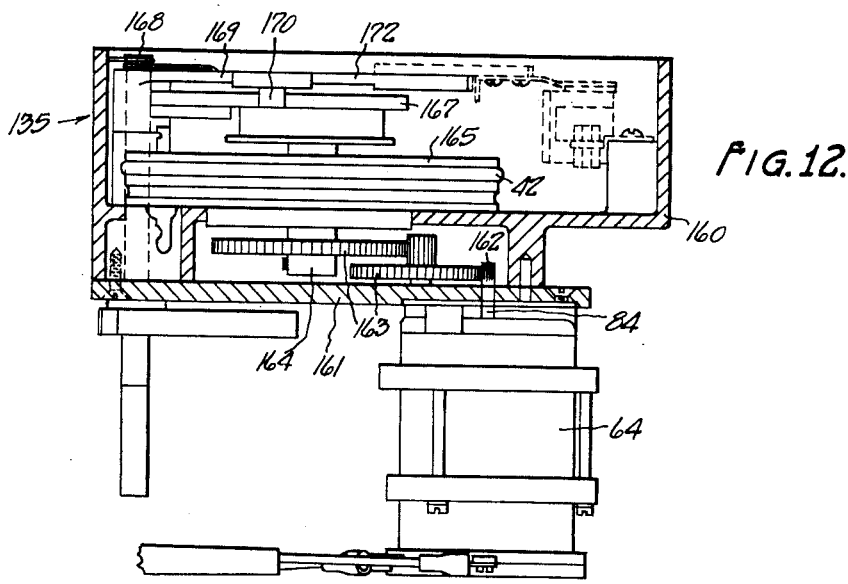
Fig. 12 is a side view of the device with parts of the casing shown in section.

The motor unit 135 of the device is illustrated in Figs. 11 and 12 and preferably comprises a frame 160 which is mounted upon the rear of the plate upon which the chart 143 and the dial 142 are carried. The motor 64 is mounted upon a plate 161 constituting a part of the frame 160 with its shaft 84 projecting therethrough and mounting a pinion 162 which meshes with the gear of a gear train 163 for the purpose of driving a shaft 164. This shaft mounts upon it a disk or hub 165 within the housing 160 which mounts the slide wire 42 of the rebalancing potentiometer. The contactor 46 of said potentiometer is held in engagement with the slide wire 42 as by a spring arm 166.

The outer end of the shaft 164 preferably mounts a cam 167. This cam may be of any shape desired or required according to the usage of the instrument for the purpose of eliminating any non-linear function inherent in the device or in the condition to which the device responds. A bell crank is pivoted at 168 to the housing 169 and includes an arm 169 mounting a roller unit 170 bearing against the periphery of the cam 167. A spring unit 171 may be provided for the purpose of urging the arm 169 in a direction to insure continuous engagement of the roller 170 with the periphery of the cam 167. The other arm 172 of the bell crank is adapted to be associated by any suitable means in the nature of links and levers (not shown) which constitute the mechanism for actuating either or both of the indicating pointer 144 and the pen arm 145.

The device has, in addition to the various advantages enumerated above, a number of other advantages. One of these advantages is that it may be easily adapted to all Wheatstone bridge transmitters by the use of the calibrating means as illustrated diagrammatically in Fig. 1. Thus the slide wire 46 may be shunted across either of the two measuring arms of the bridge, and the other two arms are shunted by the zero balancing resistor. The calibration is put in a central section of the bridge as shown, the calibrating resistance 52 and 53 serving to increase the range of reading or response of the instrument with an increase in resistance, and the calibrators 51 and 50 decreasing the range of reading or response of the instrument with an increase in resistance. This allows a great flexibility in calibration and also in automatic compensation. For instance, the calibration may be changed automatically to respond to an independent condition, such as temperature or pressure or both, by inserting resistances 53 and 51 which correspond to this condition or conditions. This allows a great flexibility in the use of resistance elements for this compensation because, as stated above, resistor 53 increases the range of response and resistor 50 decreases it.

Another advantage of this recorder is that the slide wire 42 is shunted across the arms of the bridge to nullify the effects of contact resistance in the slide wire itself or in the leads between the same and the transmitting unit. It is preferred that the circuit in which the slide wire 42 works have a resistance in the nature of 5,000 ohms to make possible quick disconnections through standard separable connectors. This has considerable practical advantage for replacement of parts in the field. Such a system may tend, however, to give a very small non-linearity of response as far as the slide wire position of the potentiometer parts 42 and 46 is concerned. Such non-linear response, however, is corrected by the cam 167. The cam may serve in addition to correct for any non-linearity in the transmitter itself, and may also, in cases where conditions being measured vary non-linearally, for example, conditions such as flow, serve to eliminate such non-linearity as well as that referred to above.

This interchangeability of parts is best illustrated in Figs. 9 to 12, inclusive. The units illustrated in these figures are easily applied to and removed from the instrument, and with respect to the assembly illustrated in Figs. 9 and 10, individual components of the units are readily accessible for replacement and for adjustment.

It is apparent that interchangeability may be enhanced by calibrating each transmitter, for use in devices of this character electrically the same as any other like transmitter; and the same condition must be applied to each of the other units of the device, including the motor drive unit. This will make possible the interchangeability of parts in the field without special calibration.

While the invention has been illustrated and described herein with respect to one form or embodiment only thereof, it will be understood that changes may be made therein within the scope of the appended claims without departing from the spirit of the invention.

I claim:

1. In combination, an alternating current bridge circuit including an impedance element directly responsive to a variable, supply terminals, a variable impedance connected to said supply terminals in parallel to said bridge and connected to an output terminal, said means being adjustable to balance said bridge circuit, amplifier means of the type having electron tubes and responsive to departure of said bridge from balanced condition for producing a signal depending in phase and amplitude upon the sense and extent of change of said variable, and a motor controlled by and directly connected to a tube of said last named amplifier means for adjusting said impedance, said motor being a reversible electric motor having a low inertia and a speed proportioned to the amplitude of the signal.

2. In combination, an alternating current Wheatstone bridge including an impedance element directly responsive to a variable and input and output terminals, adjustable means for balancing said bridge including a variable impedance unit connected with said input terminals and one output terminal, an amplifier connected to said bridge and responsive to unbalance thereof, and a drag cup motor directly connected to said amplifier for actuating said impedance unit in a sense to restore the bridge to balance.

3. In combination, a normally balanced electrical network having input and output terminals and unbalanced by and responsive to changes in a variable for transmitting an alternating current signal whose phase depends upon the sense of said changes and whose magnitude is proportional to the extent of change, signal amplifying means of the type introducing a direct current component into said signal, variable impedance means connected to said input terminals and one output terminal for rebalancing said network, and a two-phase reversible motor for operating said rebalancing means, said motor having a torque proportional to the magnitude of said signal and having a low inertia whereby it has an instantaneous and accurate response to the duration, sense and value of a transmitted amplified signal, said motor being acted upon and stabilized by the direct current component of said amplified signal.

4. In combination, a normally balanced electrical network having input terminals and output terminals and unbalanced by and responsive to changes in a variable for transmitting an alternating current signal whose phase depends upon the sense of said changes and whose magnitude is proportional to the extent of change, said network including an impedance directly responsive to said variable, a beam power amplifier, variable impedance means for rebalancing said network and having an impedance element connected to said input terminals and a slider connected to an output terminal, and a two-phase motor for actuating said slider and having a control winding connected with said amplifier said motor having a low inertia and a torque proportional to the magnitude of said signal.

5. In combination, an alternating current source, a normally balanced electrical network having input terminals connected with said source and unbalanced by and responsive to changes in a variable for transmitting through output terminals an alternating current signal whose phase depends upon the sense of said changes and whose magnitude is proportional to the extent of change, a beam power amplifier for said signal, said amplifier introducing a direct current component into the amplified signal, and means for rebalancing said network including an impedance connected across said input terminals, a slider connected to an output terminal, and a two-phase motor actuating said slider and having one field winding connected to said source and another field winding directly connected to said amplifier, to be acted upon by both the alternating current and the direct current components of said amplified signal said motor being actuated in proportional response to that component of the alternating current output of said amplifier which is of the same frequency as the frequency of said source.

6. In combination, a normally balanced electrical network having input and output terminals and unbalanced by and responsive to changes in a variable for transmitting an alternating current signal whose phase depends upon the sense of said changes and whose magnitude is proportional to the extent of change, signal amplifying means of a type introducing a direct current component into the amplified signal said network including a primary bridge circuit as a part thereof and also including network rebalancing variable impedance means connected to said input terminals and to one output terminal, and means responsive to said amplified signal and acted upon by both the alternating current and direct current components thereof for actuating said rebalancing means in a corrective sense and including a drag cup motor.

7. In combination, a normally balanced electrical network unbalanced by and responsive to changes in a variable for transmitting an alternating current signal whose phase depends upon the sense of said changes and whose magnitude is proportional to the extent of change, said network including a primary bridge circuit responsive to said variable and a secondary bridge circuit including said primary circuit as a part thereof and also including a variable impedance, and means responsive to said signal for actuating said impedance in a network rebalancing sense, said last named means including a low inertia reversible motor developing a torque proportional to the amplitude of said signal.

8. In combination, a normally balanced electrical network unbalanced by and responsive to changes in a variable for transmitting an alternating current signal whose phase depends upon the sense of said changes and whose magnitude is proportional to the extent of change, said network including bridge circuit having input and output terminals and responsive to said variable a conductor connected across said input terminals, a variable impedance interposed in said conductor, a lead connecting said impedance to an output terminal, and means responsive to said signal for actuating said impedance to rebalance said network.

9. In combination, a measuring Wheatstone bridge circuit responsive to variations in a condition and comprising four legs connected together in series, a secondary rebalancing bridge circuit of comparatively high impedance having four legs connected together in series and each leg thereof connected in parallel relation to the corresponding leg of said primary circuit a variable impedance member in said secondary circuit, and means responsive to an electrical variation in a leg of said primary circuit for varying said impedance member in said secondary circuit to rebalance both circuits.

10. In combination, a Wheatstone bridge circuit, two leads connected diagonally across said bridge circuit and each including a variable resistance unit of high impedance having a shiftable contactor, leads connecting said units with said bridge at diagonally opposite points intermediate the connections of said first named leads, and means connected to said last named leads and responsive to an unbalance of said bridge for adjusting one of said variable resistance units to reestablish the balance of said bridge circuit.

11. In combination, a Wheatstone bridge circuit, two leads connected diagonally across said bridge circuit and each including a variable resistance unit of high impedance having a shiftable contactor, leads connecting said units with said bridge intermediate the connections of said first named leads, and means connected diagonally across said bridge circuit and responsive to an unbalance of said bridge for adjusting one of said variable resistance units to reestablish the balance of said bridge circuit, one of said last named leads having a plurality of electrical compensating means interposed therein, said last named means being connected in selected relation to said compensating means whereby said compensating means do not affect the stability or zero reading of said bridge circuit.

12. In combination, a Wheatstone bridge circuit responsive to variations in a condition, two leads connected diagonally across said bridge circuit and each including a potentiometer having a slide contactor of high impedance, leads connecting said contactors with said bridge at diagonally spaced points intermediate the connections of said first leads, means connected to said last named leads and responsive to an unbalance of said bridge by said condition for adjusting one of said potentiometer contactors to rebalance said bridge circuit, and means in one of said last named leads responsive to a second condition to compensate for said second condition automatically without altering the balance point of said bridge circuit.

13. In combination, a Wheatstone bridge circuit responsive to variations in a condition, two leads connected diagonally across said bridge circuit and each including a potentiometer having a slide contactor, leads connecting said contactors with said bridge at diagonally spaced points intermediate the connections of said first leads, means connected to said last named leads and responsive to an unbalance of said bridge by said condition for adjusting one of said potentiometer contactors to rebalance said bridge circuit, and means in one of said last named leads responsive to a second condition, and a plurality of compensating elements interposed in said last named lead in series with said second condition responsive means.

14. In combination, a Wheatstone bridge circuit responsive to variations in a condition, two leads connected diagonally across said bridge circuit and each including a potentiometer having a slide contactor, leads connecting said contactors with said bridge at diagonally spaced points intermediate the connections of said first leads, means connected to said last named leads and responsive to an unbalance of said bridge by said condition for adjusting one of said potentiometer contactors to rebalance said circuit, and means in one of said last named leads responsive to a second condition, said rebalancing means including an amplifier of the beam power type and a drag cup motor controlled by said amplifier for actuating said rebalancing potentiometer contactor.

15. In combination, a Wheatstone bridge circuit having input terminals and output terminals and responsive to variations in a condition, zero adjusting means including a circuit connected across the input of said bridge and having a potentiometer of high impedance with an adjustable contactor, a lead connecting said contactor to one of said output terminals, rebalancing means including a circuit connected across the input of said bridge and having a potentiometer of high impedance with an adjustable contactor, a lead connecting said last named contactor to the other output terminal, and means connected to said output terminals and responsive to variations in said condition for adjusting the potentiometer contactor of said rebalancing means.

16. In combination, a Wheatstone bridge circuit having input terminals and output terminals and responsive to variations in a condition, zero adjusting means including a circuit connected across the input of said bridge and having a potentiometer with an adjustable contactor, a lead connecting said contactor to one of said output terminals, rebalancing means including a circuit connected across the input of said bridge and having a potentiometer with an adjustable contactor, a lead connecting said last named contactor to the other output terminal, and means connected to said output terminals and responsive to variations in said condition for adjusting the potentiometer contactor of said rebalancing means, and a plurality of calibrating resistors connected in series in said last named lead and said bridge circuit and on opposite sides of the correlated output terminal.

17. In combination, a Wheatstone bridge circuit having input terminals and output terminals and responsive to variations in a condition, zero adjusting means including a circuit connected across the input of said bridge and having a potentiometer with an adjustable contactor, a lead connecting said contactor to one of said output terminals, rebalancing means including a circuit connected across the input of said bridge and having a potentiometer with an adjustable contactor, a lead connecting said last named contactor to the other output terminal, and means connected to said output terminals and responsive to variations in said condition for adjusting the potentiometer contactor of said rebalancing means, and separable connectors detachably interconnecting at least one of said bridge, zero adjusting means, rebalancing means and said last named means.

18. In combination, a Wheatstone bridge circuit having input terminals and output terminals and responsive to variations in a condition, zero adjusting means including a circuit connected across the input of said bridge and having a potentiometer with an adjustable contactor, a lead connecting said contactor to one of said output terminals, rebalancing means including a circuit connected across the input of said bridge and having a potentiometer with an adjustable contactor, a lead connecting said last named contactor to one of said output terminals, and means connected to said output terminals and responsive to variations in said condition for adjusting the potentiometer contactor of said rebalancing means, and a plurality of calibrating resistors connected in series in said last named lead and said bridge circuit and on opposite sides of the correlated output terminal, said zero adjusting means and said calibrating resistors comprising a unit, and separable connectors detachably connecting at least one of said unit, said bridge, said rebalancing means and said last named means.

19. In combination, a Wheatstone bridge unit having input and output terminals, zero adjusting means connected across said input terminals and including a potentiometer, a lead connecting said potentiometer with one of said output terminals, rebalancing means connected across said input terminals and including a potentiometer, a lead connecting said last named potentiometer with the other output terminal, a reversible motor for actuating said rebalancing potentiometer, and an amplifier connected to said output terminals and controlling said motor, calibrating resistors connected in said rebalancing potentiometer lead, said zero adjusting means and at least some of said calibrating resistors constituting a unit, said rebalancing means and said motor constituting a unit, said amplifier constituting a unit, and the remainder of said elements constituting a unit, and separable connectors detachably connecting at least one of said units.

20. In combination, a Wheatstone bridge circuit having input terminals and output terminals and responsive to variations in a condition, zero adjusting means including a circuit connected across the input of said bridge and having a potentiometer with an adjustable contactor, a lead connecting said contactor to one of said output terminals, rebalancing means including a circuit connected across the input of said bridge and having a potentiometer with an adjustable contactor, a lead connecting said last named contactor to the other output terminal, and means connected to said output terminals and responsive to variations in said condition for adjusting the potentiometer contactor of said rebalancing means, a plurality of calibrating resistors connected in series in said last named lead and said bridge circuit and on opposite sides of the correlated output terminal, and means for selectively varying the connection of said last named means relative to said calibrating resistors.

21. In combination, a Wheatstone bridge circuit, two leads connected diagonally across said bridge circuit and each including a variable resistance unit having a shiftable contactor, leads connecting said units with said bridge at diagonally opposite points intermediate the connections of said first named leads, and means connected to said last named leads and responsive to an unbalance of said bridge for adjusting one of said units to reestablish the balance of said bridge circuit, and separable connectors detachably interconnecting at least one of said bridge and variable resistance units.

22. In combination, an electrical network responsive to a variable condition for transmitting a signal of a sense determined by the character of a change in said condition and of an amplitude proportional to the extent of said change, said network including a primary measuring Wheatstone bridge circuit and a rebalancing circuit comprising conductors connected diagonally across said primary circuit and having an intermediate connection with said primary circuit, a plurality of impedances in said intermediate connection, zero adjusting means associated with said primary circuit and means responsive to the sense and amplitude of said signal for actuating said rebalancing means.

23. In combination, an electrical network responsive to a variable condition for transmitting a signal of a sense determined by the character of a change in said condition and of an amplitude proportional to the extent of said change, said network including a primary measuring Wheatstone bridge circuit and a rebalancing circuit of high impedance comprising leads connected diagonally across said primary circuit and having an intermediate connection with said primary circuit, said rebalancing circuit having a variable impedance a plurality of impedances in said intermediate connection, and means responsive to the sense and amplitude of said signal for actuating said variable impedance.

24. In combination, an electrical network responsive to a variable condition for transmitting a signal of a sense determined by the character of a change in said condition and of an amplitude proportional to the extent of said change, said network including a primary measuring Wheatstone bridge circuit and a rebalancing circuit of high impedance comprising leads connected diagonally across said primary circuit and including a variable impedance element having an intermediate connection with said primary circuit, and means responsive to the sense and amplitude of said signal for actuating said impedance element to rebalance said network.

25. In combination, a Wheatstone bridge circuit having input terminals and output terminals and responsive to variations in a condition, rebalancing means including a circuit connected across the input of said bridge and a potentiometer connected in series in said circuit, said potentiometer having an adjustable contactor, a lead connecting said last named contactor to an output terminal, and means connected to said output terminals and responsive to unbalance of said bridge for adjusting the potentiometer contactor to rebalance said bridge, and a plurality of calibrating resistors connected in series in said last named lead and said bridge circuit and on opposite sides of the correlated output terminal.

26. In combination, a Wheatstone bridge circuit having input terminals and output terminals and responsive to variations in a condition, rebalancing means including a circuit connected across the input of said bridge and a potentiometer connected in series in said circuit, said potentiometer having an adjustable contactor, a lead connecting said last named contactor to an output terminal, means connected to said output terminals and responsive to unbalance of said bridge for adjusting the potentiometer contactor to rebalance said bridge, and separable connectors detachably interconnecting at least one of said bridge, rebalancing means and said last named means.

27. In combination, a Wheatstone bridge circuit having input terminals and output terminals and responsive to variations in a condition, rebalancing means including a circuit connected across the input of said bridge and a potentiometer connected in series in said circuit, said potentiometer having an adjustable contactor, a lead connecting said last named contactor to an output terminal, means connected to said output terminals and responsive to unbalance of said bridge for adjusting the potentiometer contactor to rebalance said bridge, a plurality of calibrating resistors connected in series in said last named lead and said bridge circuit and on opposite sides of the correlated output terminal, and means for selectively varying the connection of said last named means relative to said calibrating resistors.

ROBERT D. RICHARDSON.

REFERENCES CITED

The following references are of record in the file of this patent:

UNITED STATES PATENTS

| Number | Name | Date |
|---|---|---|
| 583,951 | Steinmetz | June 8, 1897 |
| 1,299,965 | Leake | Apr. 3, 1919 |
| 1,586,233 | Anschutz-Kaempfe | May 25, 1926 |
| 2,246,686 | Jones | June 24, 1941 |
| 2,300,742 | Harrison et al. | Nov. 3, 1942 |
| 2,326,853 | Harrison | Aug. 17, 1943 |
| 2,346,437 | Krogh | Apr. 11, 1944 |
| 2,361,799 | Noxon | Oct. 3, 1944 |
| 2,416,579 | Godet | Feb. 25, 1947 |
| 2,431,790 | Crosthwait et al. | Dec. 2, 1947 |